July 3, 1956 — J. W. LESS — 2,752,604
METHODS FOR MANUFACTURING NECKTIES
Filed Aug. 29, 1952 — 7 Sheets-Sheet 1
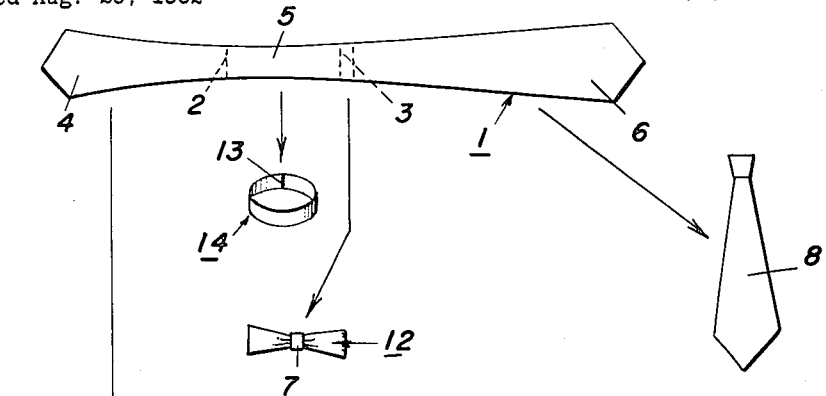
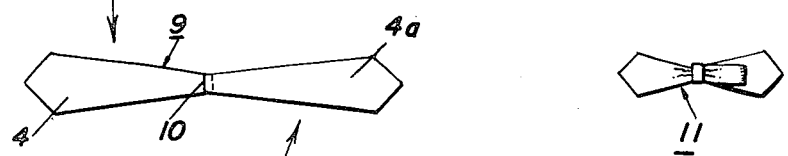
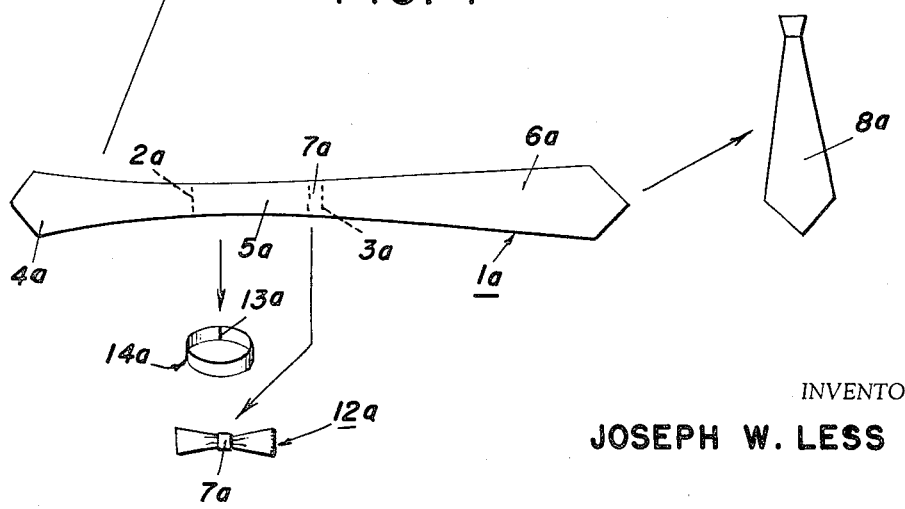
FIG. 1
INVENTOR
JOSEPH W. LESS
BY Stone, Boyden & Mack
ATTORNEYS July 3, 1956 — J. W. LESS — 2,752,604
METHODS FOR MANUFACTURING NECKTIES
Filed Aug. 29, 1952 — 7 Sheets-Sheet 2

INVENTOR
JOSEPH W. LESS

BY Stone, Boyden & Mack
ATTORNEYS

July 3, 1956  J. W. LESS  2,752,604
METHODS FOR MANUFACTURING NECKTIES
Filed Aug. 29, 1952  7 Sheets-Sheet 3

INVENTOR
JOSEPH W. LESS
BY *Stone, Boyd & Mack*
ATTORNEYS

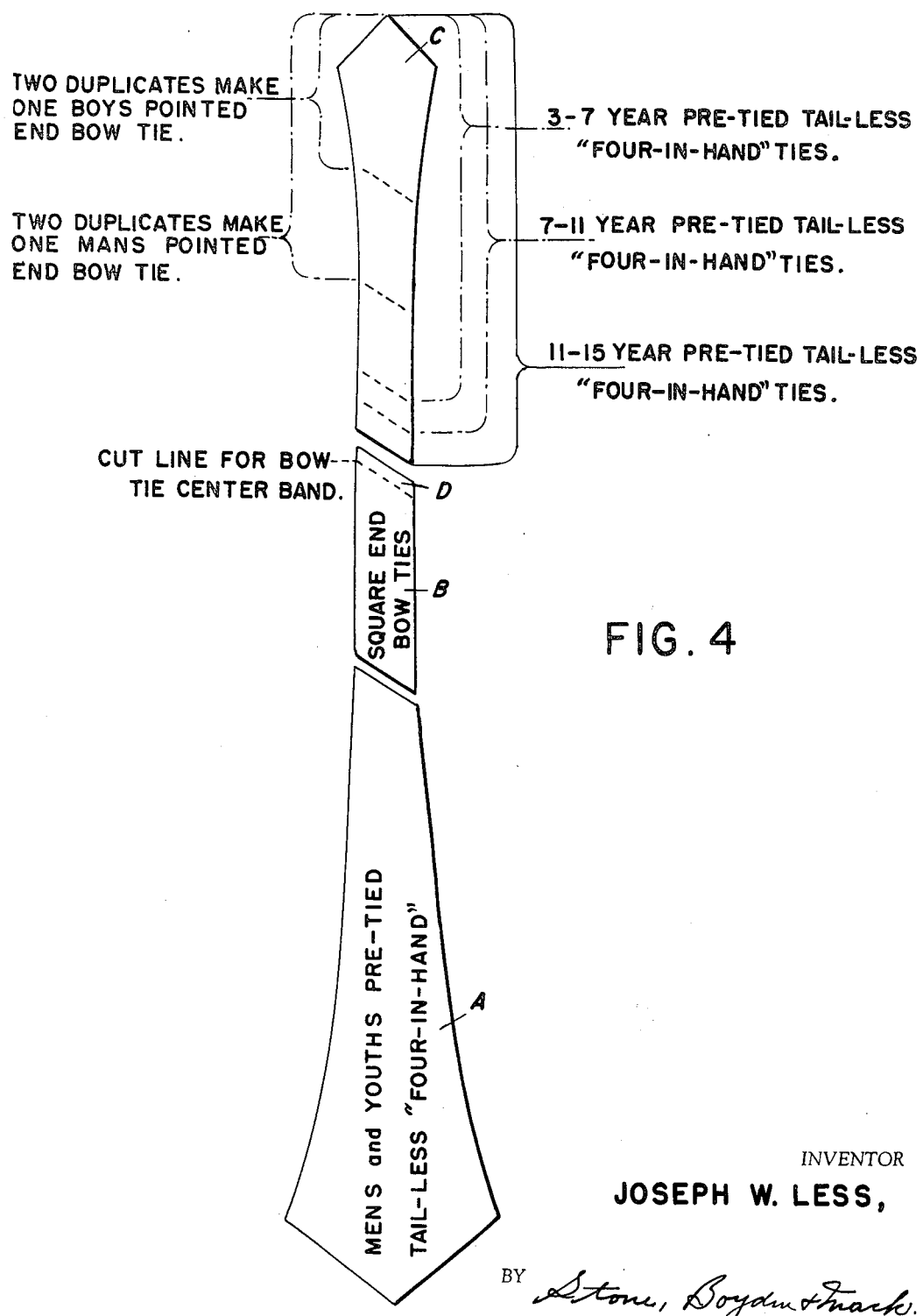

INVENTOR
JOSEPH W. LESS

July 3, 1956  J. W. LESS  2,752,604
METHODS FOR MANUFACTURING NECKTIES
Filed Aug. 29, 1952  7 Sheets-Sheet 7

INVENTOR
JOSEPH W. LESS
BY
Stone, Boyden & Mack
ATTORNEYS

United States Patent Office 2,752,604
Patented July 3, 1956

2,752,604

METHODS FOR MANUFACTURING NECKTIES

Joseph W. Less, Clinton, Iowa, assignor to One-in-Hand-Tie Company, Clinton, Iowa Application August 29, 1952, Serial No. 307,128

3 Claims. (Cl. 2—146)

This invention relates to the manufacture of neckties and particularly to a novel method by which men's and boys' bow ties and four-in-hand ties may be manufactured more expeditiously and economically than has heretofore been possible.

In the past, boys' four-in-hand ties have not been offered on a wide commercial scale because manufacturers have found that as much time and labor, and substantially as much material, has been required for a boy's tie as for a man's tie, yet the boy's tie cannot be sold at a comparable price. Where boys' ties have been made, they have been made by the same method as men's ties, necessitating separate patterns, linings and tippings for each size. Much the same situation has prevailed with respect to boys' bow ties.

Various efforts have been made in the prior art to perfect a pre-tied tie. To the best of my knowledge, however, few if any pre-tied four-in-hand ties had attained any real degree of commercial acceptance before the advent of the invention disclosed in my co-pending application, Serial Number 307,127, filed August 29, 1952. In any event, neckwear manufacturers have heretofore been unable to employ pre-tying as a means to improve the unprofitable situation with respect to boys' ties.

My invention provides a combined method for manufacturing men's and boys' four-in-hand and bow ties which makes it possible to produce boys' ties at prices acceptable to the buyer and yet profitable to the manufacturer. The method provides for substantially 100% productive use of the cloth and eliminates the necessity for laying out the boy's ties separately and preparing the linings and tippings separately. Another advantage of the method is that it makes possible the simple and economical production of matched sets of ties for father and son.

The invention is particularly adapted to the production of tailless pre-tied four-in-hand ties of the type disclosed in my aforesaid co-pending application, Serial Number 307,127, and pre-tied bow ties of the type disclosed in my co-pending application, Serial Number 307,126, filed August 29, 1952, now Patent No. 2,683,881, dated July 20, 1954, but is not limited to such ties.

Broadly, my method comprises the steps of making a tubular blank in the general configuration of a four-in-hand tie and then separating this blank into separate portions to provide at least a small end portion and a large end portion. A tailless pre-tied man's tie is then made from the large end portion, preferably in the manner described in said application Serial Number 307,127. The small end portion is utilized in making a separate tie.

It is preferable to start by making two identical tubular blanks each in the form of a conventional four-in-hand tie, and then sever each blank transversely into three portions in such a manner that like portions from the two blanks are identical. Then two identical pre-tied men's four-in-hand ties are made from the two large end portions. Two like ones of the remaining portions are joined end-to-end to form a bow tie blank, from which a pre-tied bow tie is made. The two remaining portions are either also joined end-to-end to form a bow tie blank, or are each made into a boy's pre-tied tailless four-in-hand tie.

In order that the invention may be understood in detail, reference is had to the accompanying drawings which form a part of this specification and wherein:

Fig. 1 is a diagrammatic illustration of the steps of one embodiment of the method;

Fig. 4 is a diagram showing the manner in which a tie blank may be severed in the manufacture of various types of ties in accordance with the method;

Figure 2:
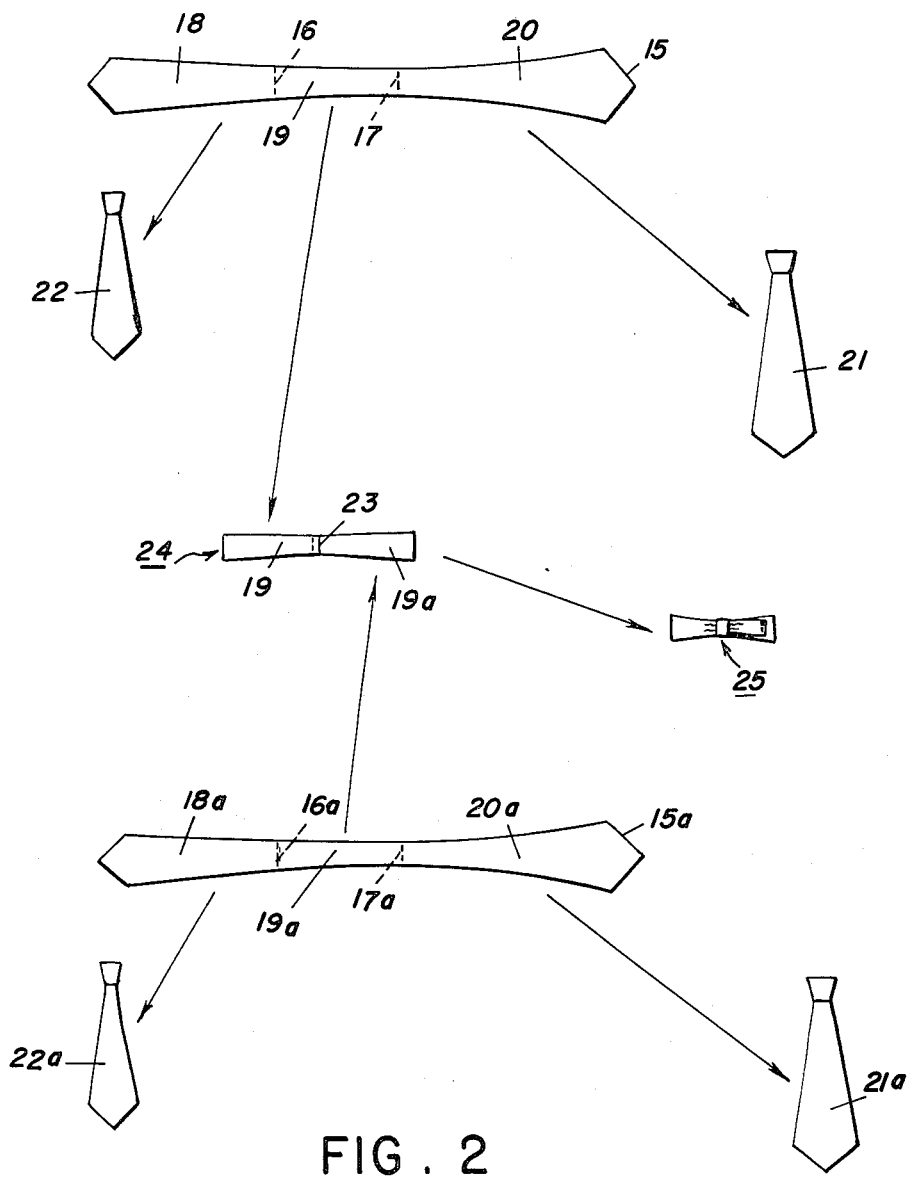
Fig. 2 is a diagrammatic illustration of the steps of a second embodiment of the method.

Referring now to the drawings in detail, and first to Fig. 1 thereof, it will be seen that the first step of my method is to form a tie blank 1. Preferably, such blank is tubular and in the shape of a conventional four-in-hand tie, being fully lined and sewn and having the usual large end and small tail. Similarly, a second blank 1a is formed in all respects identical with and from material of the same design pattern as the blank 1. The blank 1 is severed transversely at 2 and 3 to provide the small end portion 4, the central portion 5 and the large end portion 6. Similarly, the blank 1a is severed at 2a and 3a to provide the small end portion 4a, the central portion 5a and the large end portion 6a. Small parts 7 and 7a are preferably severed from the ends of central portions 5 and 5a, respectively. The cuts 2a and 3a are made at the same points along the blanks 1a as are the cuts 2 and 3 on the blank 1, so that the corresponding portions from the two blanks are identical.

The large end portions 6 and 6a are now each made into a tailless pre-tied man's tie 8 and 8a, respectively, as in the manner described in my aforesaid application, Serial Number 307,127.

The small end portions 4 and 4a are joined end-to-end to form the bow tie blank 9. For example, the cut ends of the portions 4 and 4a may be overlapped and sewn, as at 10. The blank 9 is then formed into a pre-tied bow tie 11, as in the manner hereinafter described with reference to Fig. 5.

The portions now remaining are the central portions 5 and 5ª, and in this embodiment of the method, these are made into identical square ended pre-tied boys' bow ties 12 and 12ª, respectively. The tie 12 is made by sewing together the ends of portion 5 at 13 to provide the closed loop 14, then flattening the loop 14 and compressing it at the midle by securing the small strip 7 thereabout, as indicated. Any suitable means for attaching the tie 12 to the shirt collar of the wearer may be provided. The tie 12ª is made in precisely the same manner.

While cuts 2, 3, 2ª and 3ª have been shown as at right angles to the longitudinal axis of the blanks 1 and 1ª, respectively, it will be understood that such cuts may be at oblique angles and, under some conditions, it is preferable that the cuts be made oblique. It will be understood that the particular location of the cuts will depend upon the length desired for the particular ties, as later discussed with reference to Fig. 4.

In Fig. 1, the two small end portions are joined to form a bow tie blank. This procedure need not be followed, as seen in Fig. 2, where the central portions are the ones joined end-to-end. Here, the two blanks 15 and 15ª are transversely severed at 16 and 17 and 16ª and 17ª, respectively. Thus, cutting of the blank 15 provides a small end portion 18, a central portion 19 and a large end portion 20. Similarly, the blank 15ª provides a small end portion 18ª, a central portion 19ª and a large end portion 20ª.

The large end portions are utilized to make tailless pre-tied men's ties 21 and 21ª, respectively. The small end portions are utilized to make tailless pre-tied boys' ties 22 and 22ª, respectively.

Figure 5:
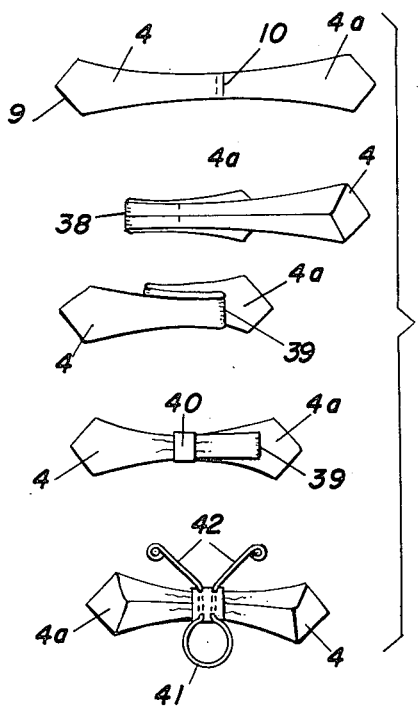
Fig. 5 is a diagrammatic illustration of one procedure for forming a pre-tied bow tie in accordance with the invention.

The smaller ends of the central portions 19 and 19ª are joined together, as by overlapping and sewing at 23, to form the square-ended bow tie blank 24, and this blank is formed into the pre-tied bow tie 25 in the manner hereinafter discussed with reference to Fig. 5.

In each of the embodiments of the invention just discussed, two like portions are secured together in end-to-end relation to form a bow tie blank. These two portions are duplicates, and such duplication is accomplished in these embodiments by making two identical blanks in the form of a four-in-hand tie, then severing the blanks. The duplication need not be obtained in this manner, however, as will be seen from Fig. 3. In the embodiment there illustrated, a tubular blank 26 in the form of a conventional four-in-hand tie is transversely severed at 27 and 28 to provide a small end portion 29, a central portion 30 and a large end portion 31. The large end portion 31 is formed into a tailless pre-tied man's tie 32, and the small end portion 29 is similarly formed into a tailless pre-tied boy's tie 33.

To prepare the bow tie blank, a duplicate 34 of the central portion 30 is made from a separate piece of material of the same design pattern. The two narrower ends of the portion 30 and its duplicate 34 are then joined, as by overlapping and sewing at 35. The resulting blank 36 is then formed into a pre-tied bow tie 37.

It will be understood that, where the first step of the method is to make two identical tubular blanks in the general form of a four-in-hand tie, and two like portions severed therefrom are joined to form one bow tie blank, the two original blanks are of the same material and design pattern. Thus, the resulting ties can be grouped as matched pairs of father and son ties.

The preferred cutting procedure is illustrated in Fig. 4. The large end portions A of each blank will always be employed for making a tailless pre-tied tie, either in men's or youths' sizes. The central portions B will normally be used to make a square-ended bow tie blank, either by the "closed loop" method seen in Fig. 1 (when portion B is long and portion C short) or by joining two identical central portions (when portion B is relatively shorter, as will be the case when portion C is, for example, used to make a pre-tied tailless tie for boys in the 11–15 age group). The small end portion C will be used either to make a pre-tied tailless four-in-hand tie, or two such portions will be joined end-to-end to form a bow tie blank having pointed ends. As indicated, a small piece D is preferably cut from portion B to serve as a center band for the bow tie. Regardless of the size and assortment of ties so produced, substantially all of the material is used. It will be understood that the blank may vary in size. For example, where the small end portions C are to be joined to form a pre-tied man's bow tie, the blank may be of the size and proportion usually employed as a conventional man's four-in-hand tie. But, if the small end portions C are to be joined to form a pre-tied boy's bow tie, the blank may be of the size and proportion conventionally employed in "junior" four-in-hand ties.

As previously mentioned, the invention is not limited to any particular procedure for forming the pre-tied ties per se. As an example, Fig. 5 illustrates one procedure for making a bow tie from the blanks 9, Fig. 1, 24, Fig. 2, or 36, Fig. 3. For purposes of clarity, the blank 9 will be referred to. The blank is folded first at 38, and then at 39, to provide the typical bow tie arrangement. A relatively narrow strip or band of fabric 40 is then secured about the center of the tie to compress the structure into the desired shape. A wire clip is then secured to the band 40 at the back of the tie to provide means for attaching the tie to the shirt, no neckband being used. This clip may include, for example, a downwardly extending loop 41 to be engaged behind the neckband of the wearer's shirt, and upwardly extending outwardly curving spring tensioning arms 42 to engage beneath the fold line of the collar.

Figure 6:
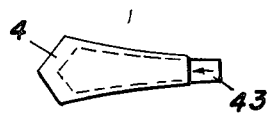
Fig. 6 is a detail view illustrating one step which may be employed in the procedure represented in Fig. 5.

In some instances, it is desirable to provide a relatively stiff bow tie blank. Sections, such as 4 and 4ª, cut from the original blank are of course tubular. Thus, where added stiffness is desired, I insert a stiffening member 43, Fig. 6, into each of the portions 4, 4ª via the open cut end of that portion. The stiffening member 43 may be of wool felt, plastic sheeting, impregnated cloth or other suitable flexible material capable of giving the desired body to the tie structure.

A suitable procedure for making a tailless pre-tied man's or boy's necktie in accordance with the invention is illustrated in Figs. 7–15.

Figure 7:
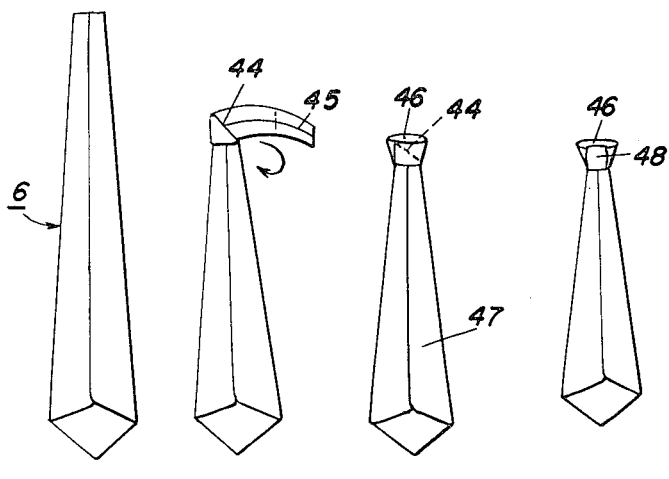
Fig. 7 is a diagram illustrating the preliminary steps employed in forming a tailless pre-tied boy's or man's tie in accordance with the invention.
Figure 8:
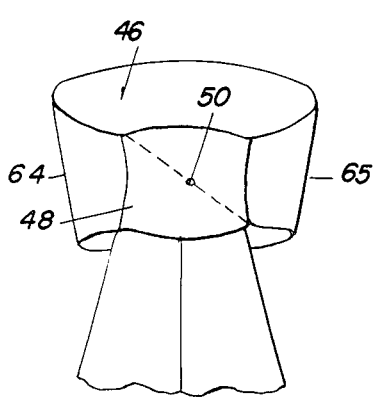
Fig. 8 is a rear elevational view showing a preliminary knot structure obtained by the steps illustrated in Fig. 7.
Figures 9, 12:
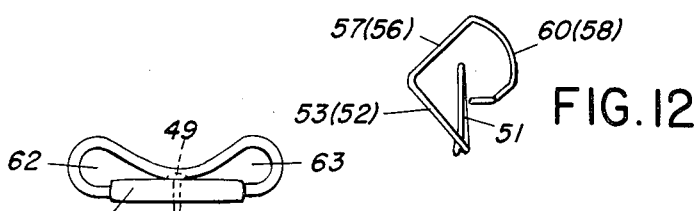
Fig. 9 is a top view of the structure shown in Fig. 8.
Fig. 12 is an end view of the device shown in Fig. 10.

As seen in Fig. 7, the large end portion 6 (obtained as described with reference to Fig. 1) is first formed into a preliminary knot structure. First, the portion 6 is folded upon itself at 44 and across the back of the tie to provide a laterally extending part 45. The part 45 is then passed around in front of the tie and lapped over the fold 44 to form a closed loop 46. The tail 47 is then brought up and over the fold 44 and passed down through the loop. The resulting preliminary knot is shown in Figs. 8 and 9, and consists of the loop 46 and roll 48. A suitable headed pin is positioned with its head 49 beneath one ply of fabric of the loop 46 and with its pointed shank 50 extending through the roll 48 from front to rear, serving to secure the preliminary knot structure.

Figure 10:
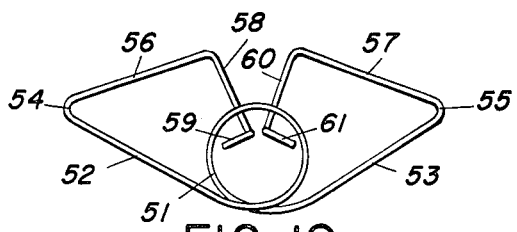
Fig. 10 is an elevational view of a wire knot shaping and tensioning device.
Figure 11:
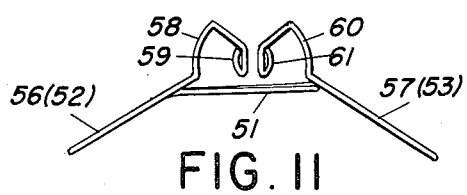
Fig. 11 is a top view of the device shown in Fig. 10.

To complete the pre-tied tie, the spring wire knot shaping and tensioning device shown in Figs. 10–12 is employed. This device comprises a single turn torsion spring 51 having its ends extended oppositely and laterally to form the arms 52 and 53, respectively, these arms being provided with return bends 54 and 55, respectively, forming additional arms 56 and 57. The arms 52 and 56 lie in the same plane. Similarly, the arms 53 and 57 lie in the same plane, and the two planes thus defined are angularly disposed relative to the plane of spring 51. The arm 56 terminates in a generally semi-circular portion 58 lying substantially at right angles to the plane of spring 51, as shown in Fig. 11, and terminating in a hooked end 59. Similarly, the arm 18 joins a like portion 60 which terminates in a hook 61.

Figure 13:
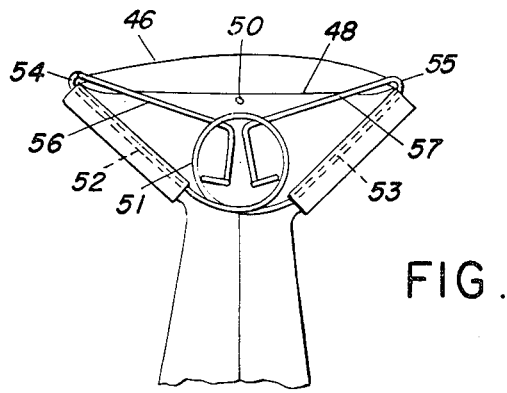
Fig. 13 is a rear elevational view similar to Fig. 8 but showing the device of Figs. 10–12 in place.

Referring to Figs. 8 and 9, it will be noted that the loop 46 of the preliminary knot structure provides openings 62 and 63, the loop having side portions 64 and 65 which are, of course, relatively limp. The first step in using the device of Figs. 10–12 is to insert the free ends thereof upwardly through the openings 62 and 63 until the arms 52 and 53 lie against the inner surfaces of the sides 64 and 65 of the loop, as seen in Fig. 13. During such insertion, the torsion spring 51 is positioned outside of the knot structure, so that the spring lies flush against the back surface of the roll 48. The spring is bent during such insertion so that the angle of divergence of the arms 52 and 53 is roughly as seen in Fig. 13, and the side portions 64 and 65 of the loop of the knot are thus drawn around and back behind the roll 48.

Figure 14:
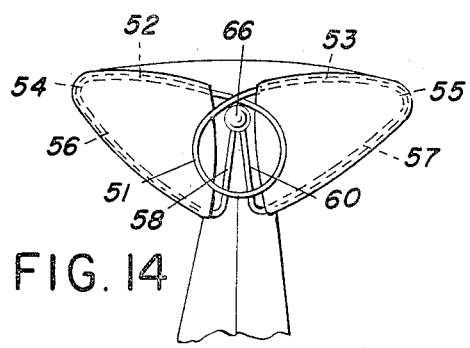
Fig. 14 is a rear elevational view of a completed knot structure.
Figure 15:
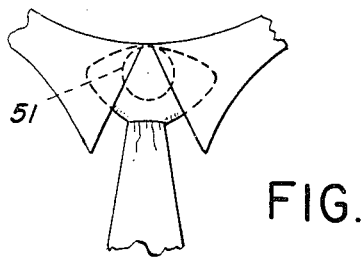
Fig. 15 is a front view showing the completed knot structure in place on a shirt collar.

Next, the entire shaping and tensioning device is rotated back, up and over, so that the torsion spring 51 is caused to assume the inverted position illustrated in Fig. 14, with the arms 52 and 53 now extending substantially horizontally across the knot. The hooked ends 59 and 61 are now slipped over the shank 50, and a friction cap 66, Fig. 14, is placed over the end of the shank. The knot is now complete. It will be noted that the spring 51 lies on the outside of the knot at the back thereof, depending downwardly. To secure the tie in place on the wearer's shirt, as seen in Fig. 15, the loop of the spring 51 is simply engaged over and behind the neckband of the collar.

The specific procedure for making a pre-tied tailless tie as illustrated in Figs. 7–15 is described in greater detail and claimed in the aforesaid copending application Serial Number 307,127, filed August 29, 1952, and forms no part of the present invention.

Figure 3:
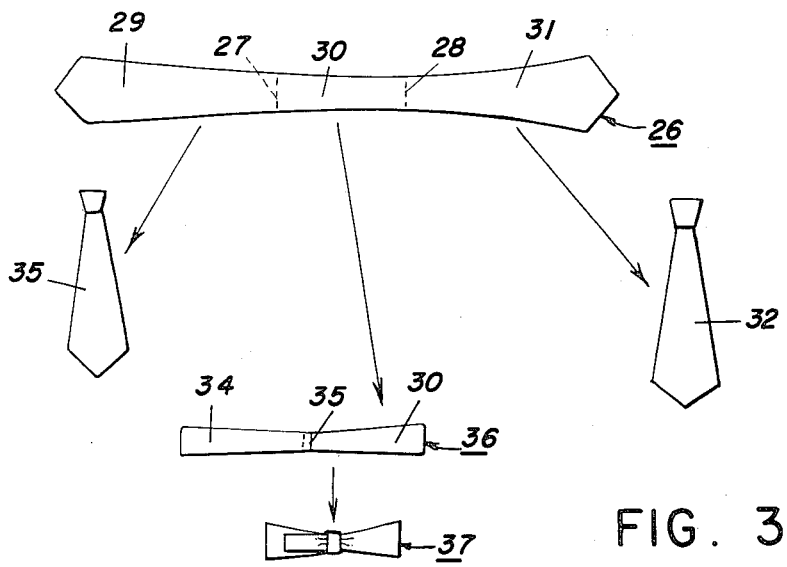
Fig. 3 is a diagrammatic illustration of the steps of a third embodiment thereof.
Figure 16:
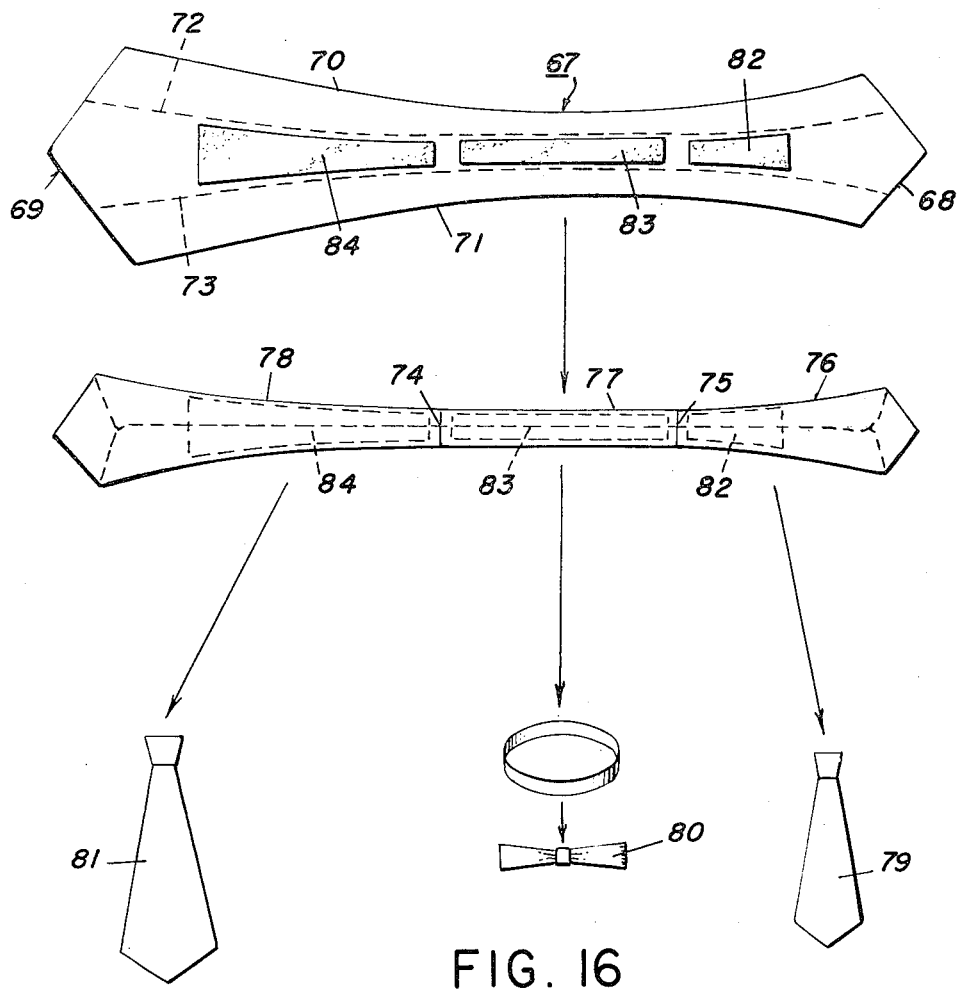
Fig. 16 is a diagrammatic illustration of yet another embodiment of the invention.

In the embodiments of my method illustrated in Figs. 1–3, the initial blanks are preferably in the form of conventional tubular four-in-hand ties and are fully sewn. I find that it is equally satisfactory to form a tubular blank without sewing the blank up the back. Thus, as shown in Fig. 16, I may start by cutting from suitable neckwear goods a flat blank 67 having a large pointed end 68 and a small pointed end 69 and tapering from each end toward the center, as is customary in forming conventional four-in-hand tie blanks. The edges 70 and 71 of the flat blank may simply be pinked, and the ends 68 and 69 hemmed. I then fold the blank 67 along the longitudinal fold lines 72 and 73, so that the edge portions of the blank are brought around behind the blank body. Then, the folded blank is transversely severed along the lines 74 and 75 to provide the small end portion 76, the central portion 77 and the large end portion 78. The cut ends are preferably overstitched in any conventional manner.

The three portions 76–78 may then be formed into pre-tied ties in any of the manners previously discussed. For example, the small end portion 76 may be utilized to form a boy's tailless pre-tied tie 79, the central portion 77 to form a boy's square-ended bow tie 80 in the manner discussed with reference to Fig. 1, and the large end portion 78 to form a man's pre-tied tailless tie 81. In all of the three ties 79—81, the folded material will be "locked up," without stitching along the back, by reason of the pre-tied knot structures.

In some instances it is desirable to provide a relatively stiff lining for the ties, and I accomplish this by placing three separate pieces of lining 82—83 upon the flat blank 67 before making the longitudinal folds. These may be secured in place in any suitable manner, or may be left loose, to be fixed in place by the pre-tied knots.

Figure 17:
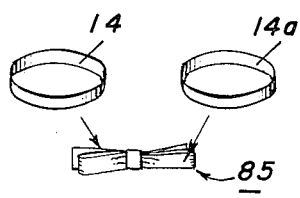
Fig. 17 is a diagram illustrating the manner in which a double bow tie may be made in accordance with the invention.

In Fig. 1, I have illustrated an embodiment of my method in which the central portions from two blanks are each formed into what may be termed a single bow. Referring now to Fig. 17, it will be seen that these two central portions may be formed into one double bow rather than two single bows. To accomplish this, I first make the two closed loops 14 and 14ᵃ by joining the ends of the central portions 5 and 5ᵃ, respectively, in the manner previously discussed with reference to Fig. 1. I then flatten the two loops in the plane of the fabric, superimpose them, and bind the combination of both loops at the center with the center band 7, thus forming the double bow 85.

I claim:

1. A method of manufacturing a plurality of matched ties from a completed four-in-hand necktie having a large end portion, a small end portion, and an intervening neckband portion; which comprises severing said necktie transversely at substantially the junctures of said large and small end portions with said neckband portion, thereby providing three necktie blanks, forming the large severed end portion with a simulated knot to provide a tailless pre-tied necktie, utilizing the other severed end portion in the construction of a matching necktie, and utilizing said severed neckband portion in the construction of a bow tie.

2. A method according to claim 1 comprising the additional step of forming the small severed end portion with a simulated knot in the provision of a second and smaller tailless pre-tied matching necktie.

3. A method according to claim 1 comprising the additional step of securing said severed neckband portion to a similar neckband portion severed from a second completed four-in-hand necktie in the provision of said bow tie.

References Cited in the file of this patent

UNITED STATES PATENTS

| | | |
|---|---|---|
| 952,726 | Clinch | Mar. 22, 1910 |
| 1,527,230 | Schreter | Feb. 24, 1925 |
| 1,692,991 | Howard | Nov. 27, 1928 |
| 1,980,507 | Tausik | Nov. 13, 1934 |
| 2,122,811 | Fiumedoro | July 5, 1938 |
| 2,394,024 | Taborski et al. | Feb. 5, 1946 |